Figure 1:

Aug. 23, 1966 S. N. SCHLEIN 3,267,658
METHOD AND APPARATUS FOR FORMING SPLICES AND DEAD
ENDS AND LOCKING MEANS THEREFOR
Filed April 16, 1964 2 Sheets-Sheet 1

INVENTOR.
Seymour N. Schlein
BY
J. W. Douglass
his atty.

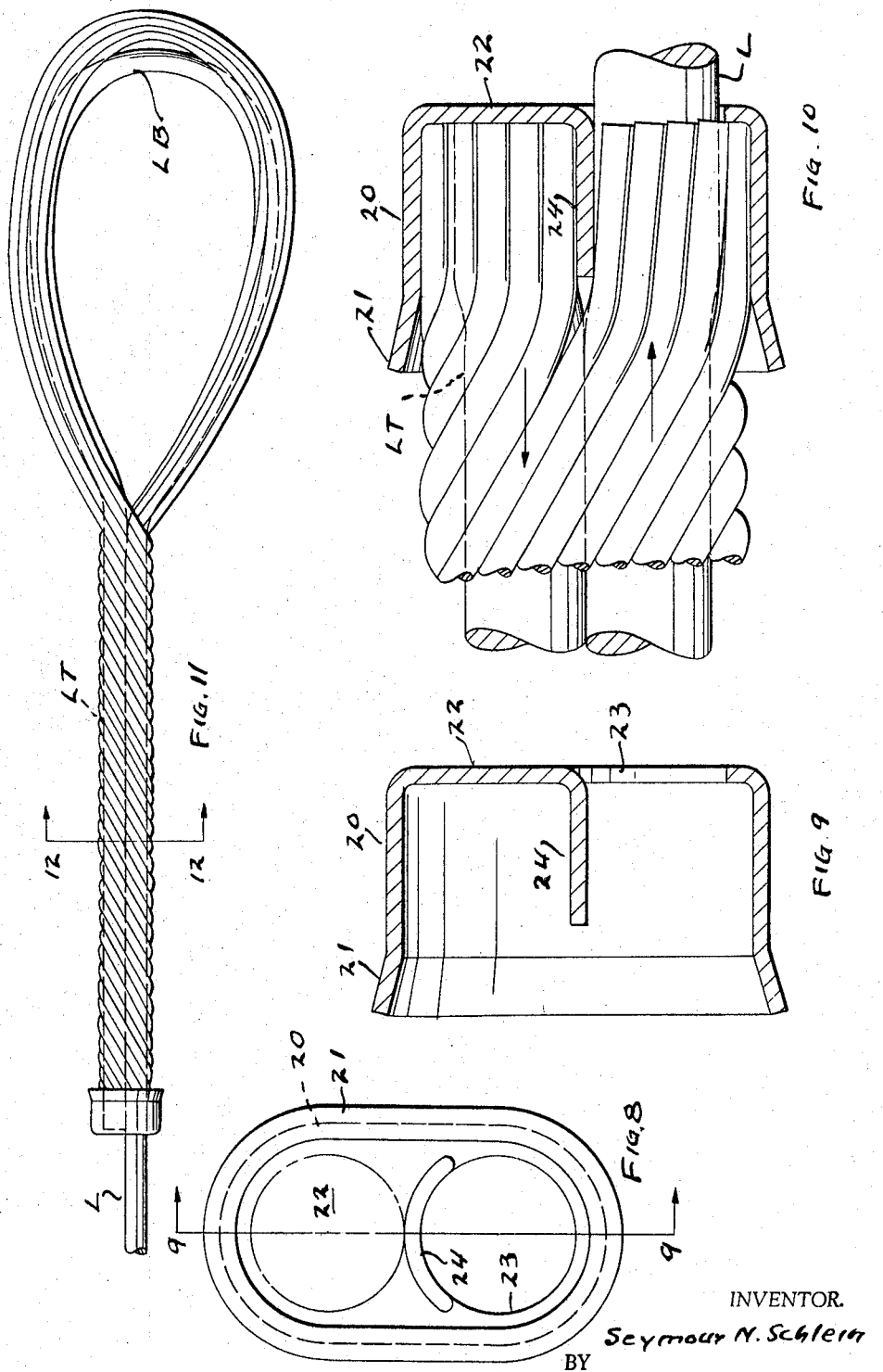

United States Patent Office 3,267,658
Patented August 23, 1966

3,267,658
METHOD AND APPARATUS FOR FORMING SPLICES AND DEAD ENDS AND LOCKING MEANS THEREFOR
Seymour N. Schlein, University Heights, Ohio, assignor to The Fanner Manufacturing Company, a division of Textron, Inc., Cleveland, Ohio, a corporation of Rhode Island
Filed Apr. 16, 1964, Ser. No. 360,220
10 Claims. (Cl. 57—145)

This invention relates to a method and means for holding a pair of strands or lines together for the splicing or dead ending of a line. It is an improvement over the invention disclosed in Patent No. 3,132,468, of May 12, 1964, to Jess C. Little.

As is well known to those versed in the art, it has been common practice to secure a pair of line strands together by the use of clamp means which usually comprised a pair of clamp blocks having grooves on their inner faces for engagement with the two lines. The blocks were secured together and clamped the lines by means of two or more bolts which extended through the blocks and usually between the lines. The above had the disadvantage that the blocks were costly and it took a considerable amount of time to effect the installation.

The same blocks could also be used to make a dead end. In this instance, the line was formed to provide a bight which was placed through an eye bolt or anchor rod and the portion of the line which was bent back to form the bight was secured to the main line portion by the clamp blocks.

In both of the above uses the clamp blocks and the bolts resulted in areas where the compressive effect was highly concentrated and the holding power was due solely to the clamping effect of the clamp blocks.

It was also possible to wrap the two parts with soft wire, after the manner of Patent No. 2,405,270, of August 20, 1946, which is commonly known as "mousing."

In the case of the "mousing" annealed wire had to be used and in time the line vibrations caused the same to loosen, making replacement necessary.

In the application of the clamp rod or armor rods to a pair of line parts, as disclosed in said Little patent, some difficulty was realized during the installation because there was nothing to "anchor" the rods at one end, at the time of installation, with the tendency for the rods to move around the line parts rather than to be wrapped around the line parts.

When the rods are used as a clamp means near the ground, as they frequently are used in the making of dead ends, it is possible for unauthorized persons of mischievous nature to "unwrap" the rods from the line parts and to cause a failure of the dead end.

In addition, the free ends of these rods frequently extend far enough from contact with the line, that portions of wearing apparel of persons which may come in proximity to the line, become engaged with and are torn thereby. Furthermore the previous clamp rods were often made largely in the form of a true helix and such a helix had limited engagement with the strands of the line unless considerably distorted.

The present invention contemplates a new form and method of making a dead end, or a line splice wherein the above disadvantages are largely eliminated.

In addition, by making the rods in an appropriate form, greater circumferential contact with the line parts may be realized with a resultant greater holding power.

Still other advantages of the invention and the invention itself will become more apparent from the following description of an embodiment thereof, which is illustrated by the accompanying drawings and forms a part of this specification.

Figure 3:
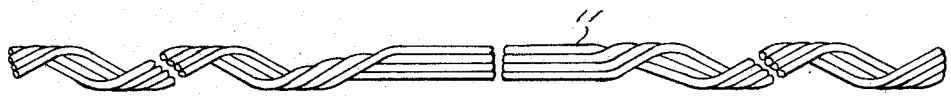
Figure 6:
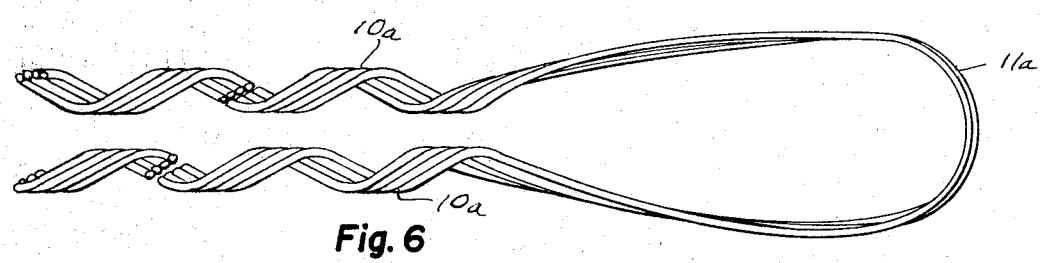
Figure 7:
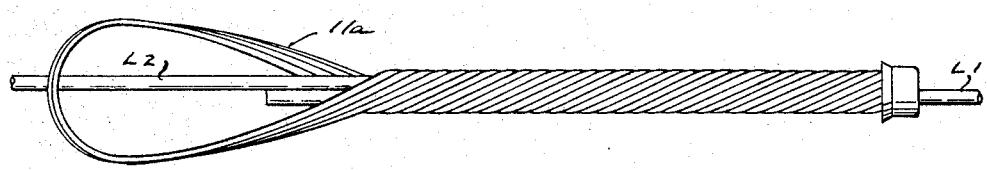
Figures 5, 12:
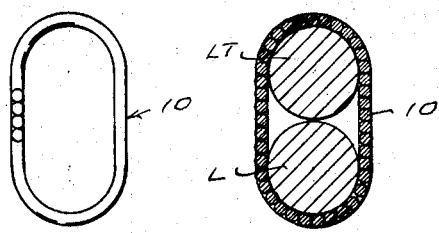
Figures 2, 4:
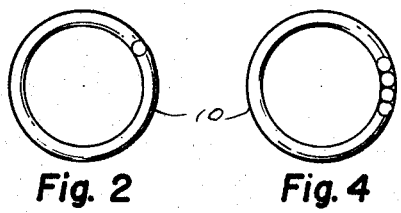

In the drawings:

FIG. 1 is an elevational view of a single clamp rod;
FIG. 2 is an enlarged end view thereof;
FIG. 3 is a view of an assembly of clamp rods, prior to bending;
FIG. 4 is an enlarged end view thereof;
FIG. 5 is an end view of the clamp rods of FIG. 3, in another stage of manufacture;
FIG. 6 is a view of the assembly of FIG. 3, which has been bent;
FIG. 7 is an assembly view of the clamp rods, as used to make a splice;
FIG. 8 is an enlarged end elevational view of a holding and locking ferrule used in the invention;
FIG. 9 is a section on the line 9—9 of FIG. 8;
FIG. 10 is an enlarged fragmentary view of the end portions of the clamp rods disposed over two line parts with the holding ferrule shown in position and in section;
FIG. 11 is a view showing the clamp rods used to make a dead end; and
FIG. 12 is an enlarged section on the line 12—12 of FIG. 11.

Throughout the drawings, like parts have been designated by like reference characters.

As best shown in FIG. 1, the basic element used in practicing the invention is a rod or wire 10 made with the end portions each in the form of an open helix, such as shown in FIG. 1. The rod is of a hard drawn resilient wire and the helix has an inner diameter which is less than twice that of the lines to be spliced or line to be dead ended, and greater than the diameter of the line alone. The direction of the helix pitch should preferably be the same as that of the line. The pitch length thereof should be such that when applied to the two line parts they subtend an included angle of about 45° between the axes of the lines and the axes of the rods where they pass alongside the two lines on the sides which are in a direction opposite to the direction in which the line parts are tending to move, as described in said Little patent. Although the rods may be helical throughout their length, it is preferred that there be an intermediate zone 11 where the rods are straight.

The rods, such as shown in FIG. 1, are assembled in groups. These groups are such that the helices of the rods are consecutively contiguous to each other. This is sometimes known as intertwisting the rods to form a partial lay. Such an assembly is shown in FIGS. 3 and 4.

In order to maintain such an assembly intact, it is preferred to coat the rods with some suitable cement. At the same time, it is desirable to place an abrasive material on the inner surfaces of the helix while the cement is still tacky, such as silica sand. In some instances, a conductive abrasive is used.

A preferred way of making the above assembly is to take the rods, which are helical through their length, secure them together in the manner indicated, and then straighten out the center zone. This has the advantage that the rods maintain their desired helical phase relationship so that they are contiguous to each other, in the final assembly.

The rods may then be bent to the formation shown in FIG. 6, where the straight portions provide a loop 11a and the two helical portions, legs 10a, the helices of which are in 180° phase displacement to each other.

Either prior to the bending or after bending, the helices may be flattened out by wrapping them around a mandrel of a cross section, which is substantially the same as that of the two line parts juxtaposed to each other to which the unit is to be applied, and then pressing it and the mandrel between a pair of suitable dies. The helix of the wire so deformed takes the shape as shown in FIG. 5.

Actually it is sometimes preferred that the mandrel be smaller than the overall cross-section of the two wires, whereby the gripping power may be increased. It is pointed out that due to the resiliency of the rods, they may be wrapped around the mandrel the same as they would be wrapped around the line and this places the wires under stress. They are then flattened against the mandrel and the flattening distorts the wires to the flat generally helical form of FIG. 5.

The element of FIG. 6 is then used by the workman in the field to make splices or dead ends, as shown in FIGS. 7 and 11. In the making of a dead end, the line L is bent at LB to form a bight with a tail LT extending along the main line in contact therewith. It will be appreciated that the bight LB may be of any size and can be reeved through an anchor rod, insulator or even around a pole, at the time of bending.

After the tail part LT is brought alongside the main line, the element of FIG. 6 is placed, with the junction of the loop 11a with the legs 10a, at the place where the line bight LB is to start. Then the legs 10a are then crossed over and wrapped around the contiguous line part LT and L. They can be simultaneously wrapped around the parts or one leg at a time.

Of particular importance is the function of the loop 11a during the wrapping process. As disclosed in the aforesaid Little patent, rods without the loop could be wrapped around the line parts to provide the clamping of the line L with the tail LT. Considerable difficulty was sometimes realized in that type of installation, because there was nothing to hold the ends of the rods except the workman's hand and it sometimes required two hands to do the wrapping. When the loop 11a is provided, however, the loop acts as an anchor or fulcrum for the holding of the ends of the rods against spreading. Thus the wrapping is quicker and considerably easier since the wrapping may start at the bight end and proceed down toward the main run of the line, and the legs are held against accidental unwrapping by the loop 11a.

It is pointed out that the loop 11a of the clamp rods does not have to be in the same direction as the bight of the line but can be placed on the line from the opposite direction. In some instances, this is an advantage in that since the clamping is started away from the bight of the line, and proceeds toward the bight, the bight may be closed slightly easier.

When the two lines $L_1$ and $L_2$ are to be spliced together, as shown in FIG. 7, the lines are merely brought alongside each other and the clamp rods applied, the end of the loop being placed at the ends of the one line $L_1$ where it overlaps the line $L_2$, and the legs wrapped around the line parts.

Due to the fact that the clamp rods may be preformed or deformed in the helix portions to the general shape of a cross section of the two lines juxtaposed to each other, as shown in FIGS. 5 and 12, the rods have a greater contact with the line parts, this contact being substantially one-half of the circumference of each of the lines. This provides a greater holding power which is in addition to the holding power realized by the angle that the rods subtend where they pass beside the two line parts, as more particularly described in the aforesaid Little patent.

As previously briefly mentioned, the character of the previous dead ends which were made of preformed rods was such that they could be unwrapped by mischievous persons. Further, in some instances, the ends of the rods could project away from the line, particularly where there were two line parts clamped together, which could catch upon the clothing or body of persons who happened to engage the same.

The present invention constitutes a new type of locking device which can be used in conjunction with the line and rods which affords a protection for the ends of the rods, prevents the rods from being easily unwrapped and provided an additional auxiliary clamping of the ends away from the bight.

It is pointed out that although it is contemplated that the loop 11a of the rods, which is only used as a fulcrum for installation of the rod, be left in situ after installation, it can be cut off should it so be desired, and one of the locking devices about to be described be placed at each of the ends of the clamp rods. This is particularly expedient when splices are being made.

The locking device, as shown in FIGS. 8 to 10, comprises a skirt or shell 20 having a flared mouth 21, the skirt being generally in the form of the cross section of the two juxtaposed line portions, but larger. The end opposite the mouth is provided with an end wall 22, one portion of which is lanced to provide an opening 23, the lanced portion being bent inwardly to provide a curved projection 24.

This device, as installed, is illustrated in FIG. 10. Prior to forming the bight in the line, it is placed on the line with the line extending through the opening 23 and the skirt extending toward the end of the line that is to be formed into a bight. In the case of a splice, it is placed on the line beyond the end of the splice, with the skirt extending toward the splice. The opening 23 is sufficiently large that the line may easily pass therethrough.

After the bight has been formed and the clamp rods applied, the device is then slid on the line up to the end of the tail LT. The flared portion of the skirt enables it to surround both of the line parts and the ends of the clamp rods. Then the end wall 22 is hammered to drive the curved projection between the end of the tail LT and the line L. This causes the tail to be forced away from the line at its end and this results in a spreading of the parts which causes the ends of the clamp rods to be compressed between the line parts and the skirt 20. The driving of the device is continued until the end of the tail LT bottoms against the wall 22.

It will thus be seen that not only are the ends of the clamp rods protected but that sufficient pressure is exerted on the parts within the locking device as to prevent accidental removal, and to form a secure lock for the clamp rods, increasing the holding power down to the very ends.

In the case of a splice, the device is applied in an identical manner. In addition, the loop of the clamp rods may be cut off and and the locking device used on each end of the splice. It is also apparent that the locking device may be used in place of the locking device described in the Little patent.

It is apparent that due to the shape of the helix, the holding power of the clamp rods is increased. This enables a shorter splice or dead end to be made, which is a decided improvement over the prior art.

The action of the locking device enables still shorter rods to be used and it, together with the loop, increases the holding power because at the free end the locking device holds the rods and at the loop end of the rods the loop holds the rods against movement. Of particular interest is the fact that the loop of the clamp rods, being at the point where the line bight starts, permits a certain amount of come and go for these parts and that this causes the ends of the clamp rods to spread and contact with the loop portion acting as a resilient means, resisting the spreading and returning them to their original position.

Having thus described the invention in some embodiments thereof, I am aware that numerous and extensive departures may be made therefrom without departing from the spirit or scope of the invention as defined by the appended claims.

I claim:

1. In combination with a line to be dead ended, said line being bent back upon itself to form a bight with the line and a portion of the bent back portion extending in contact with each other, means to hold the contacting line parts in frictional contact with each other comprising a plurality of clamp rods having portions of generally helical form wrapped around said contacting line parts to hold them together and at least a pair of said rod portions having a portion bent to form a loop extending beyond one end of the contacting line parts.

2. A dead end as described in claim 1, wherein said helical portions are oval in transverse form with the greatest width being less than twice the diameter of the line and the narrow width less than the diameter of the line.

3. A dead end as described in claim 1, wherein said helical portions are flattened to provide a contour substantially the same as that of a transverse section of the two lines with the width being less than the two lines and greater than one line in one transverse direction and less than that of the line in the other transverse direction normal to the first direction.

4. In combination with a line to be dead ended, said line being bent back upon itself to form a bight with the line and the bent back portion extending in contact with each other, means to hold the contacting line parts in frictional contact with each other comprising a plurality of clamp rods having portions of generally helical form wrapped around said contacting line parts to hold them together and having straight portions which are bent to form a loop extending toward the bight of the line.

5. A device as described in claim 1, wherein means is provided for holding the ends of said rods remote from the bight including a member having an opening therethrough with the line extending through the opening and a cup portion adjacent the first portion to receive the end of said bent back portion.

6. A device as described in claim 5, wherein said holding means is provided with a skirt sufficiently large to receive the ends of the clamp rods.

7. A device as described in claim 6, wherein said holding means is formed with a portion between the cup and the other portion which is disposed between the two line parts to distort the end of the bent back portion.

8. The method of forming a dead end on a line which includes folding the line back upon itself to provide a pair of portions in engagement with each other and a bight portion extending beyond said engaging portions, engaging said engaging line portions to hold them in frictional engagement with each other by applying a plurality of preformed clamp rods each having generally helical formed end portions and a helix holding portion disposed intermediate said end portions by disposing said helix holding portion beyond the one end of the portions of the engaging line portions and wrapping the free end portions around the line parts.

9. The method as described in claim 8, wherein a holding means having an interior surface for engagement with the line parts and rods is moved into engagement with the ends of said rods and the end of said bent back portions of said line.

10. The method as described in claim 9, wherein said holding means is driven onto the end of said free end line portion and has a part extending and driven between it and the main body of the line to move the line parts away from each other and the rods into firm contact with the interior of the holding means.

References Cited by the Examiner

UNITED STATES PATENTS

| | | | |
|---|---|---|---|
| 2,761,273 | 9/1956 | Peterson | 57—145 |
| 2,849,771 | 9/1958 | Rohland | 57—142 X |
| 3,132,468 | 5/1964 | Little | 57—145 |
| 3,190,065 | 6/1965 | Little | 57—145 |

STANLEY N. GILREATH, *Primary Examiner.*

D. E. WATKINS, *Assistant Examiner.*